(12) United States Patent  
Ishizuka

(10) Patent No.: US 8,243,279 B2
(45) Date of Patent: Aug. 14, 2012

(54) DISPLACEMENT MEASUREMENT APPARATUS

(75) Inventor: Ko Ishizuka, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 321 days.

(21) Appl. No.: 12/568,545

(22) Filed: Sep. 28, 2009

(65) Prior Publication Data

US 2010/0079767 A1 Apr. 1, 2010

(30) Foreign Application Priority Data

Sep. 29, 2008 (JP) .................................. 2008-250529

(51) Int. Cl.
*G01B 11/02* (2006.01)
(52) U.S. Cl. ........................................................ 356/499
(58) Field of Classification Search .................. 356/498, 356/499, 500, 521
See application file for complete search history.

(56) References Cited

U.S. PATENT DOCUMENTS

| 5,204,524 A * | 4/1993 | Ichikawa et al. ........ 250/237 G |
| 5,493,397 A | 2/1996 | Huber |
| 5,666,196 A * | 9/1997 | Ishii et al. .................... 356/499 |
| 5,742,391 A * | 4/1998 | Kaneda et al. ............... 356/499 |
| 7,433,048 B2 * | 10/2008 | Park ............................. 356/500 |
| 7,440,113 B2 | 10/2008 | Trutna, Jr. |
| 7,907,286 B2 * | 3/2011 | Holzapfel .................... 356/499 |

FOREIGN PATENT DOCUMENTS

| JP | 6-18291 A | 1/1994 |
| JP | 6-288722 A | 10/1994 |
| JP | 2007-171206 A | 7/2007 |

* cited by examiner

*Primary Examiner* — Michael A Lyons
(74) *Attorney, Agent, or Firm* — Canon USA Inc IP Division

(57) ABSTRACT

A displacement measurement apparatus includes a first diffraction grating transmitting light from a light source and producing diffracted beams including first to third diffracted beams output in different directions; a second diffraction grating movable together with an object to be measured, provided in a plane parallel to the first diffraction grating, and reflecting the first to third diffracted beams transmitted through the first diffraction grating; a first photodetector receiving the first and second diffracted beams diffracted by the second diffraction grating; a second photodetector receiving at least the third diffracted beam transmitted through the first diffraction grating; and a calculation unit calculating displacement of the object in a first direction in accordance with the beams received by the first photodetector, and displacement of the object in a second direction, different from the first direction, in accordance with the beam received by the second photodetector.

1 Claim, 15 Drawing Sheets

DISPLACEMENT MEASUREMENT APPARATUS

BACKGROUND OF THE INVENTION

1. Field of the Invention

The present invention relates to measurement apparatuses that obtain displacement information by converting relative displacements of objects into periodic signals and counting the periodic signals, and also relates to multi-axial displacement measurement apparatuses that measure displacements in multiple directions.

2. Description of the Related Art

Known examples of a displacement measurement apparatus that measures relative displacement of a mechanical stage employ optical encoders and laser interferometers.

An exemplary displacement measurement apparatus that measures displacement along a single axis is disclosed in Japanese Patent Laid-Open No. 6-18291 (see FIG. 4 therein). This apparatus is an interference encoder, and causes a 0th-order diffracted light beam and a +1st-order diffracted light beam resulting from light transmitted through a diffraction grating to be incident on another diffraction grating provided on a scale attached to an object to be measured, whereby a +1st-order reflected diffracted light beam resulting from the 0th-order diffracted light beam and a −1st-order reflected diffracted light beam resulting from the +1st-order diffracted light beam interfere with each other. The intensity of interference light varies with the amount of displacement. Therefore, displacement of the object is measured by detecting the intensity of interference light with a photodetector.

Another displacement measurement apparatus is disclosed in Japanese Patent Laid-Open No. 2007-171206 (see FIGS. 1 and 19 therein). This apparatus measures displacement in one direction (along the X axis) within a plane in which a diffraction grating that moves together with an object to be measured is provided, and displacement in another direction (along the Z axis) orthogonal to the plane. The displacements in the X and Z directions, are measured with respective measurement systems, each including a light source, an interferometer core, a polarization conversion device, a detector, and so forth. Specifically, two measurement systems are provided in parallel, and two light beams are applied, at Littrow angles, to a diffraction grating, whereby reflected diffracted light beams are produced. Subsequently, two pieces of displacement information as composite information with respect to the X and Z directions, i.e., Z+X information and Z−X information, are obtained. Thus, X-direction displacement information and Z-direction displacement information are calculated.

Japanese Patent Laid-Open No. 2007-171206 also discloses a triaxial displacement measurement apparatus that measures displacements in two directions (along the X and Y axes) within a plane in which a diffraction grating that moves together with an object to be measured is provided, and displacement in another direction (along the Z axis) orthogonal to the plane. Also in this case, the same measurement principle as in the biaxial measurement along the X and Z axes applies. That is, three measurement systems are used so as to obtain three pieces of displacement information, i.e., Z+X information, Z−X information, and Z+Y information. Thus, X-direction displacement information, Y-direction displacement information, and Z-direction displacement information are calculated.

Another displacement measurement apparatus that measures displacements in two directions within a plane in which a diffraction grating that moves together with an object to be measured is provided is disclosed in Japanese Patent Laid-Open No. 6-288722 (see FIG. 1 therein). This apparatus measures displacements of the object in two directions (along the X and Y axes) that are orthogonal to each other within the plane. A diffraction grating having a checkerboard pattern and configured to move together with the object is provided in a plane containing the X and Y axes. Light is made to be orthogonally incident on the diffraction grating. Light transmitted through the diffraction grating and diffracted in the X direction produces a +1st-order diffracted light beam and a −1st-order diffracted light beam, which are further made to be incident on respective incidence diffraction gratings. The +1st-order diffracted light beam and the −1st-order diffracted light beam are introduced from the incidence diffraction gratings into respective strip waveguides provided in the XY plane, and are subsequently made to interfere with each other at a coupler. By detecting the resulting interference light with a detector, X-direction displacement is measured. The same applies in Y-direction measurement: light is diffracted in the Y direction into a +1st-order diffracted light beam and a −1st-order diffracted light beam, which are introduced into respective strip waveguides and are subsequently made to interfere with each other at a coupler.

The displacement measurement apparatus disclosed in Japanese Patent Laid-Open No. 2007-171206 requires a plurality of measurement systems, each including a light source, a polarization beam splitter, a deflector, a photodetector, and so forth, so as to measure displacement in a direction defined within the plane where the diffraction grating is provided and displacement in a direction orthogonal to the plane. Therefore, the apparatus becomes larger and more complicated. Moreover, in the case where a plurality of measurement systems are provided, since positions where measurements are performed vary with different axes, errors may occur particularly when high measurement accuracy is required. In addition, mathematical operations performed by a field-programmable gate array (FPGA), a central processing unit (CPU), or the like include separation operation, preventing quick signal output. For these reasons, such an apparatus may be impractical for use in stage control.

The displacement measurement apparatus disclosed in Japanese Patent Laid-Open No. 6-288722 measures displacements in two directions within the plane where the diffraction grating is provided, by introducing the plurality of diffracted light beams, produced by light transmitted through the diffraction grating, into the strip waveguides provided in a plane parallel to the diffraction grating. However, to cause the plurality of diffracted light beams that are guided respectively to interfere with each other on an actual mechanical stage, problems such as measurement errors due to modulation of the light beams during guiding may occur. In addition, the diffraction grating configured to move together with the object is a transmissive component, and therefore is provided between the light source and the incidence diffraction gratings. This increases the size and complexity of the apparatus.

SUMMARY OF THE INVENTION

The present invention provides a displacement measurement apparatus capable of measuring, with a single measurement system, displacement in a direction defined within a plane where a diffraction grating is provided and displacement in a direction perpendicular to the plane, by utilizing a plurality of diffracted light beams that are produced from light emitted from a light source and diffracted through the diffraction grating.

The present invention also provides a displacement measurement apparatus having a simple and compact configuration and capable of measuring displacements in two directions defined within a plane where a diffraction grating is provided.

According to an aspect of the present invention, a displacement measurement apparatus includes a first diffraction grating configured to transmit light from a light source and produce a plurality of diffracted beams including first, second, and third diffracted beams that are output in different directions; a second diffraction grating provided in a plane parallel to the first diffraction grating and configured to reflect the first, second, and third diffracted beams transmitted through the first diffraction grating, the second diffraction grating being movable together with an object to be measured; a first photodetector configured to receive the first and second diffracted beams diffracted by the second diffraction grating; a second photodetector configured to receive at least the third diffracted beam transmitted through the first diffraction grating; and a calculation unit configured to calculate displacement of the object in a first direction in accordance with the beams received by the first photodetector, and displacement of the object in a second direction, different from the first direction, in accordance with the beam received by the second photodetector.

In the aspect of the present invention, displacements in different directions are obtained as periodic signals that are independent from each other but are generated simultaneously. Therefore, the time required for calculation by a CPU or an FPGA can be reduced. Furthermore, compared with an apparatus including a plurality of measurement systems, the displacement measurement apparatus according to the above aspect of the present invention, including a single measurement system, is constituted by a smaller number of optical components that are substantially common to measurements in different directions. Therefore, the size of the apparatus can be reduced. Moreover, since detections for different directions are performed at a substantially single position, errors due to inclination and the like can be largely reduced.

Further features of the present invention will become apparent from the following description of exemplary embodiments with reference to the attached drawings.

DESCRIPTION OF THE EMBODIMENTS

A displacement measurement apparatus according to a general embodiment of the present invention includes a first diffraction grating, a second diffraction grating, a first photodetector, a second photodetector, and a calculation unit.

The first diffraction grating transmits light emitted from a light source, and produces a plurality of diffracted light beams, including first, second, and third diffracted beams, to be output in different directions. The first, second, and third diffracted beams further undergo diffraction, reflection, and the like, thereby producing interference light. By measuring the interference light, displacements in a plurality of directions can be measured. That is, a single measurement system measures displacements in a plurality of directions.

The second diffraction grating is provided in a plane parallel to the first diffraction grating, and is movable together with an object to be measured. The second diffraction grating reflects the first, second, and third diffracted beams produced by the first diffraction grating.

The first photodetector receives the first and second diffracted beams that are diffracted by the second diffraction grating. The second photodetector receives at least the third diffracted beam. The first and second photodetectors are provided for measuring displacements of the object in respective directions. The beams received by each of the photodetectors represent displacement in one direction. This means that there is no need to calculate displacement in one direction in accordance with beams received by a plurality of photodetectors. Accordingly, real-time control of the object in a plurality of directions is realized.

The calculation unit calculates displacement of the object in a first direction in accordance with the beams received by the first photodetector, and displacement of the object in a second direction, different from the first direction, in accordance with the beams received by the second photodetector. Since the beams received by each of the photodetectors represent displacement in one direction, the calculation unit may include two separate units: a unit responsible for calculation of displacement in the first direction, and a unit responsible for calculation of displacement in the second direction.

Exemplary embodiments of the present invention will now be described with reference to the drawings. It should be noted that the exemplary embodiments described below do not limit the present invention.

First Exemplary Embodiment

Figure 1:
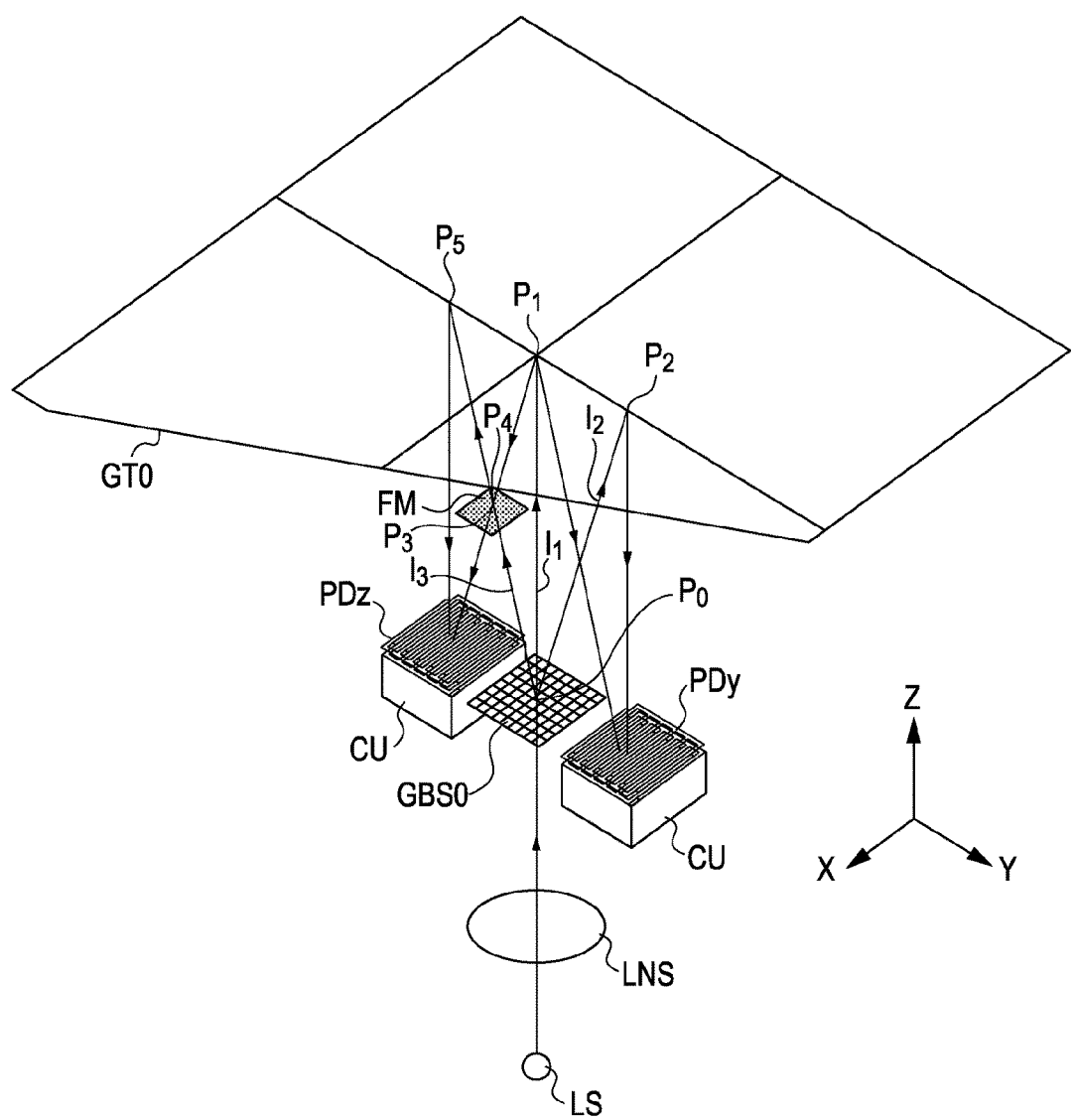
FIG. 1 is a schematic perspective view showing optical elements of a displacement measurement apparatus according to a first exemplary embodiment of the present invention.
Figure 2:
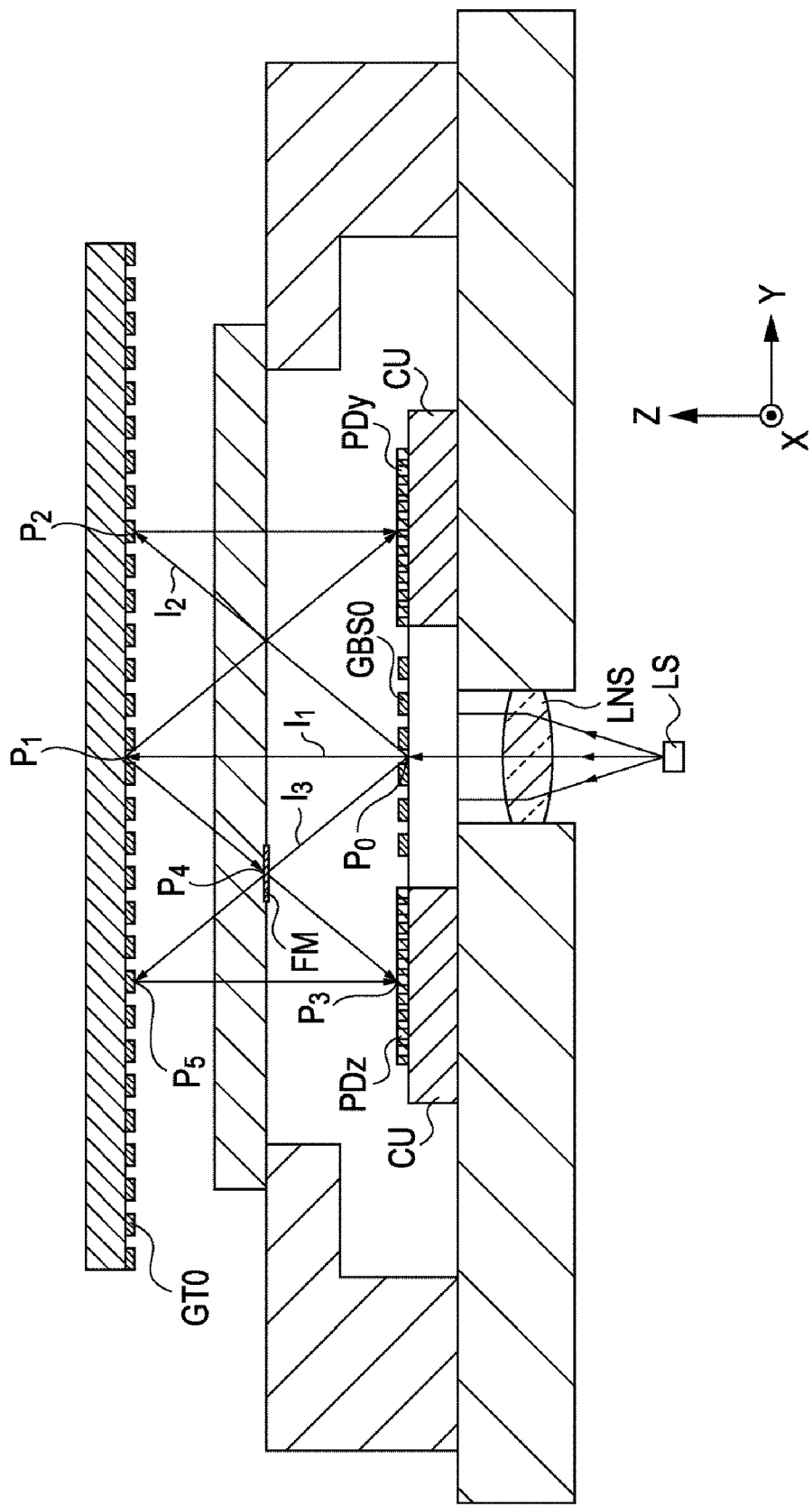
FIG. 2 is a schematic cross-sectional view showing the optical elements of the displacement measurement apparatus according to the first exemplary embodiment.

FIG. 1 is a schematic perspective view showing optical elements of a displacement measurement apparatus according to a first exemplary embodiment of the present invention. FIG. 2 is a schematic cross-sectional view showing the optical elements of the displacement measurement apparatus according to the first exemplary embodiment.

FIGS. 1 and 2 each show a first diffraction grating GBS0, a second diffraction grating GT0, a first photodetector PDy, a second photodetector PDz, calculation units CU, a reflector FM, a lens LNS, and a light source LS. The X axis and the Y axis lie in a plane where the first and second diffraction gratings GBS0 and GT0 are provided, and the Z axis is perpendicular to the plane. In the first exemplary embodiment, displacement in the Y direction and displacement in the Z direction are to be measured. The Y direction corresponds to the first direction, and the Z direction corresponds to the second direction.

The elements included in the displacement measurement apparatus according to the first exemplary embodiment will now be individually described with reference to the drawings.

The first diffraction grating GBS0 is provided in a plane containing the X and Y axes, and has a grating pattern of fine structures periodically arranged in the X and Y directions. The lens LNS is positioned relative to the first diffraction grating GBS0 in the Z direction, and the light source LS is positioned farther from the first diffraction grating GBS0 than the lens LNS. The fine periodic grating pattern of the first diffraction grating GBS0 is provided on a surface thereof remote from the lens LNS and the light source LS.

Figure 3:
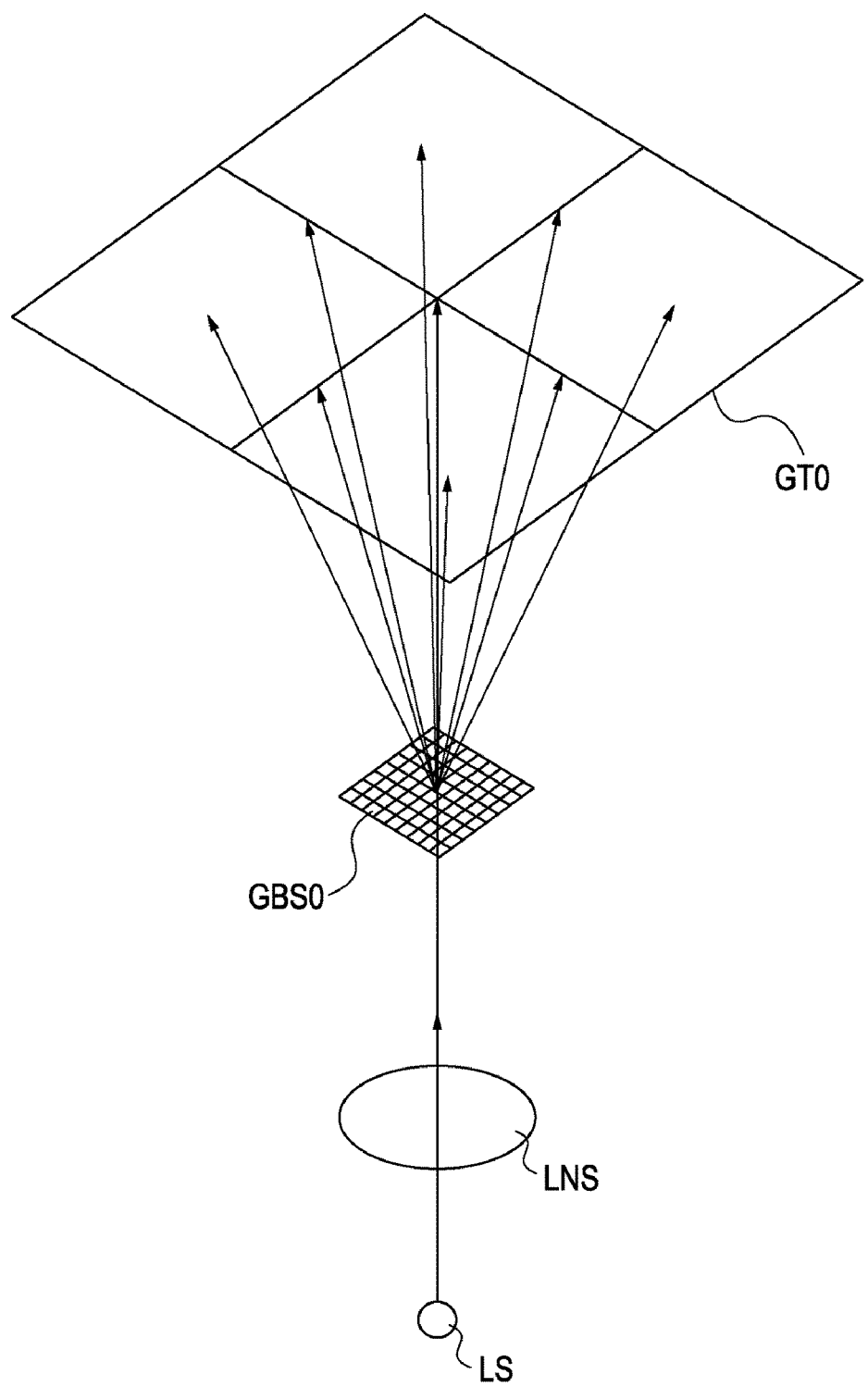
FIG. 3 illustrates diffraction and light-splitting functions of a first diffraction grating GBS0.
Figure 4:
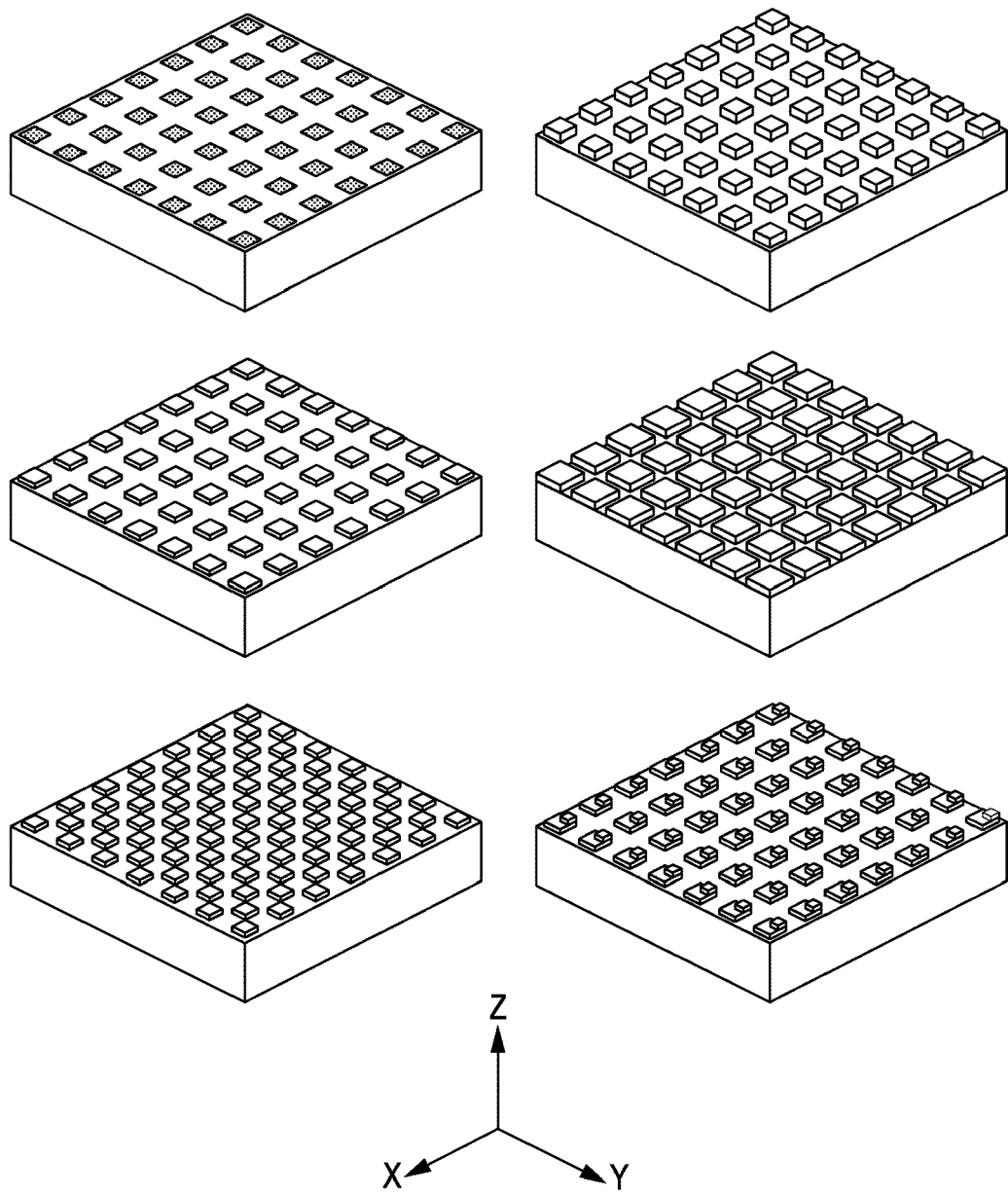
FIG. 4 includes schematic perspective views showing variations of the first diffraction grating GBS0 and a second diffraction grating GT0.

Referring to FIG. 3, the first diffraction grating GBS0 produces a plurality of light beams from a single light beam. Referring to FIG. 4, the first diffraction grating GBS0 is provided as a substrate having a micron-order pattern in which two-dimensional fine figures are arranged or three-dimensional fine structures are two-dimensionally arranged. A diffractive optical element having such a pattern of fine figures/structures can be prepared by processing a quartz-glass substrate by photolithographic selective etching, a replica method, or the like.

The second diffraction grating GT0 is provided on a side opposite the lens LNS and the light source LS with respect to the first diffraction grating GBS0 so as to be parallel to the first diffraction grating GBS0, and has on a surface thereof facing the first diffraction grating GBS0 fine periodic structures arranged in a grating pattern at least in the Y direction. The second diffraction grating GT0 moves together with the object to be measured. Therefore, by measuring the displacement of the second diffraction grating GT0, displacement of the object can be measured.

Unlike the first diffraction grating GBS0 that transmits and diffracts light, the second diffraction grating GT0 reflects and diffracts light. However, referring to FIG. 5, the second diffraction grating GT0 also splits a single light beam into a plurality of light beams, as does the first diffraction grating GBS0, and is provided as a substrate having a micron-order pattern in which two-dimensional fine figures are arranged or three-dimensional fine structures are two-dimensionally arranged, such as those shown in FIG. 4. The pattern can be formed by the same method as for the pattern of the first diffraction grating GBS0.

Figure 5:
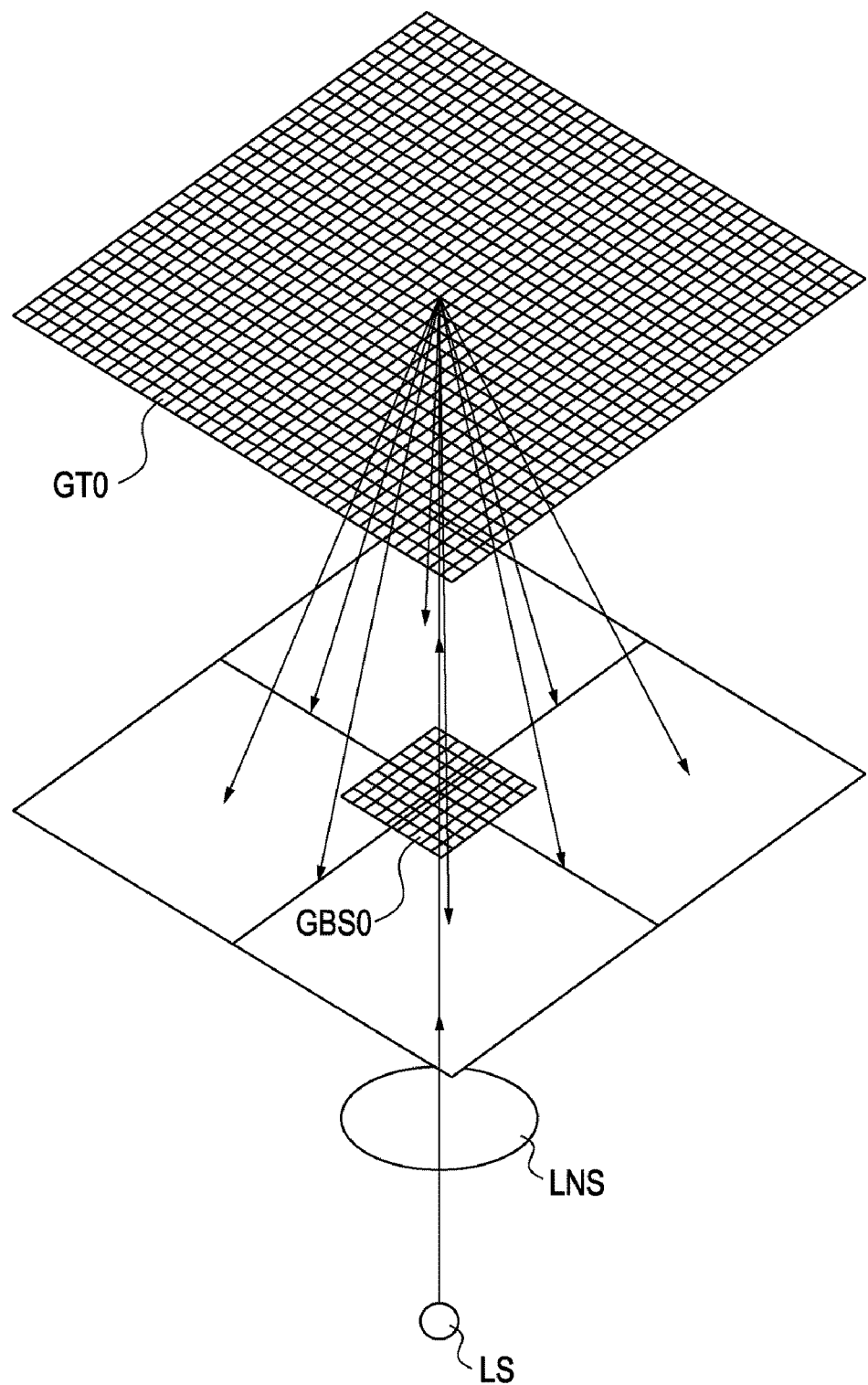
FIG. 5 illustrates diffraction and light-splitting functions of the second diffraction grating GT0.

The diffracted light beams shown in FIGS. 3 and 5 are representative beams, and in general there are other beams produced in the outside area of the shown beams. The distribution of the amount of light of such beams is changeable by appropriately changing the designs, including the shape of the fine figures/structures, the ratio of the gap between the figures/structures, the amount of level difference, and the like. That is, the designs can be optimized to efficiently produce necessary light beams. FIG. 4 shows variations of the fine pattern, including a pattern of transmissive and nontransmissive fine figures, a pattern of fine two-tiered structures, a pattern of structures with a changed amount of level difference, a pattern of structures with a changed ratio of the gap between structures, a pattern of structures in a changed arrangement, and a pattern of fine three-tiered solid structures.

The first photodetector PDy and the second photodetector PDz of the first exemplary embodiment are provided in the plane where the first diffraction grating GBS0 is provided, and receive the light diffracted by being transmitted through the first diffraction grating GBS0 and then reflected by the second diffraction grating GT0. The first photodetector PDy measures displacement of the object in the Y direction. The second photodetector PDz measures displacement of the object in the Z direction.

The first and second photodetectors PDy and PDz can be configured in various ways, as long as they can measure changes in interference fringes produced by interference between a plurality of light beams. In the first exemplary embodiment, referring to FIG. 6, the first and second photodetectors PDy and PDz each include four comb-shaped photodetector elements A(+), A(−), B(+), and B(−) having identical shapes. The four comb-shaped photodetector elements are staggered with respect to each other by ¼ of the pitch of teeth thereof. The width of each tooth corresponds to ¼ or smaller of the tooth period. Thus, light falls onto all the teeth of the four elements. In the first photodetector PDy, when the second diffraction grating GT0 moves relative thereto in the Y direction, sine-wave periodic signals that are out of phase with each other by ¼ period are output from the four photodetector elements, respectively. In accordance with these signals, displacement in the Y direction can be measured. In the second photodetector PDz, when the second diffraction grating GT0 moves relative thereto in the Z direction, sine-wave periodic signals that are out of phase with each other by ¼ period are output from the four photodetector elements, respectively. In accordance with these signals, displacement in the Z direction can be measured.

The photodetectors PDy and PDz according to the first exemplary embodiment of the present invention may each include only two or three, instead of four, comb-shaped photodetector elements, as long as a plurality of signals that are out of phase with each other can be obtained. In addition, the photodetectors PDy and PDz may be each constituted by plate-like elements having slits, instead of comb-shaped elements. Photodetectors constituted by comb-shaped elements are advantageous in that they cause little loss of light, leading to improvement in measurement accuracy, and are therefore suitable for use in controlling, for example, stages of exposure apparatuses, in which highly accurate measurement is required. Whereas, photodetectors constituted by plate-like elements having slits are advantageous in that the assembly cost can be reduced.

The calculation units CU calculate displacements of the object in the different directions in accordance with the signals output from the first and second photodetectors PDy and PDz. The calculation units CU may be provided at any position in the displacement measurement apparatus. In the first exemplary embodiment, a unit that calculates displacement in the Y direction is provided integrally with the first photodetector PDy, and a unit that calculates displacement in the Z direction is provided integrally with the second photodetector PDz.

The reflector FM is provided between the first diffraction grating GBS0 and the second diffraction grating GT0, specifically, at the midpoint between the two. The reflector FM has on both sides thereof reflective surfaces so as to reflect both of the light from the first diffraction grating GBS0 and the light from the second diffraction grating GT0, the reflective surfaces extending parallel to the first and second diffraction gratings GBS0 and GT0.

The light source LS is provided such that the light therefrom is to be incident on the first diffraction grating GBS0 through the lens LNS. The light source LS may be any of the following, in accordance with optical conditions: a laser diode (LD), a vertical-cavity surface-emitting laser (VCSEL), a superluminescent diode (SLD), and the like. In the first exemplary embodiment, an LD is employed as the light source LS. The lens LNS is provided between the light source LS and the first diffraction grating GBS0, under such optical conditions that light emitted from the light source LS is incident as parallel light on the first diffraction grating GBS0.

The light source LS and the lens LNS may be provided either inside or outside the displacement measurement apparatus. In the first exemplary embodiment, the displacement measurement apparatus includes the light source LS and the lens LNS.

The principle of measuring displacement of the object to be measured through the foregoing elements will now be described in order in which light travels.

Measurement of displacement in the Y direction will first be described.

Divergent light beams emitted from the light source LS are converted into parallel light beams by the lens LNS and are incident on the first diffraction grating GBS0.

The beams incident on the first diffraction grating GBS0 is transmitted therethrough and produce a plurality of diffracted beams, including a first diffracted beam $l_1$, a second diffracted beam $l_2$, and a third diffracted beam $l_3$, that are output in directions different from each other. In the first exemplary embodiment, the first diffracted beam $l_1$ is transmitted through the first diffraction grating GBS0 and travels straight ahead, producing a 0th-order diffracted beam; the second diffracted beam $l_2$ is diffracted in the +Y direction, producing a 1st-order diffracted beam; and the third diffracted beam $l_3$ is diffracted in the −Y direction, producing a −1st-order diffracted beam.

The first diffracted beam $l_1$ produced by the first diffraction grating GBS0 travels straight ahead and is incident at point $P_1$ on the second diffraction grating GT0 provided on a relative movement scale that moves together with the object to be measured. The second diffracted beam $l_2$ is diffracted and deflected by the first diffraction grating GBS0 and is incident at point $P_2$ on the second diffraction grating GT0. The third diffracted beam $l_3$ is diffracted and deflected by the first diffraction grating GBS0 and is incident at point $P_3$ on a surface of the reflector FM facing the first diffraction grating GBS0.

The first diffracted beam $l_1$ incident at point $P_1$ is reflected by the second diffraction grating GT0 and produces a +1st-order diffracted beam that is diffracted in the +Y direction and a −1st-order diffracted beam that is diffracted in the −Y direction. The +1st-order diffracted beam is obliquely incident on the first photodetector PDy. The second diffracted beam $l_2$ incident at point $P_2$ undergoes −1st-order diffraction and is perpendicularly incident on the first photodetector PDy.

The two beams incident on the first photodetector PDy interfere with each other, producing interference fringes thereon. When the second diffraction grating GT0 moves in the Y direction, the interference fringes also move. With the movement of the interference fringes, sine-wave signals are output from the first photodetector PDy. The phases of the signals are calculated by the corresponding calculation unit CU. Thus, displacement information with respect to the Y direction is obtained.

Figure 6:
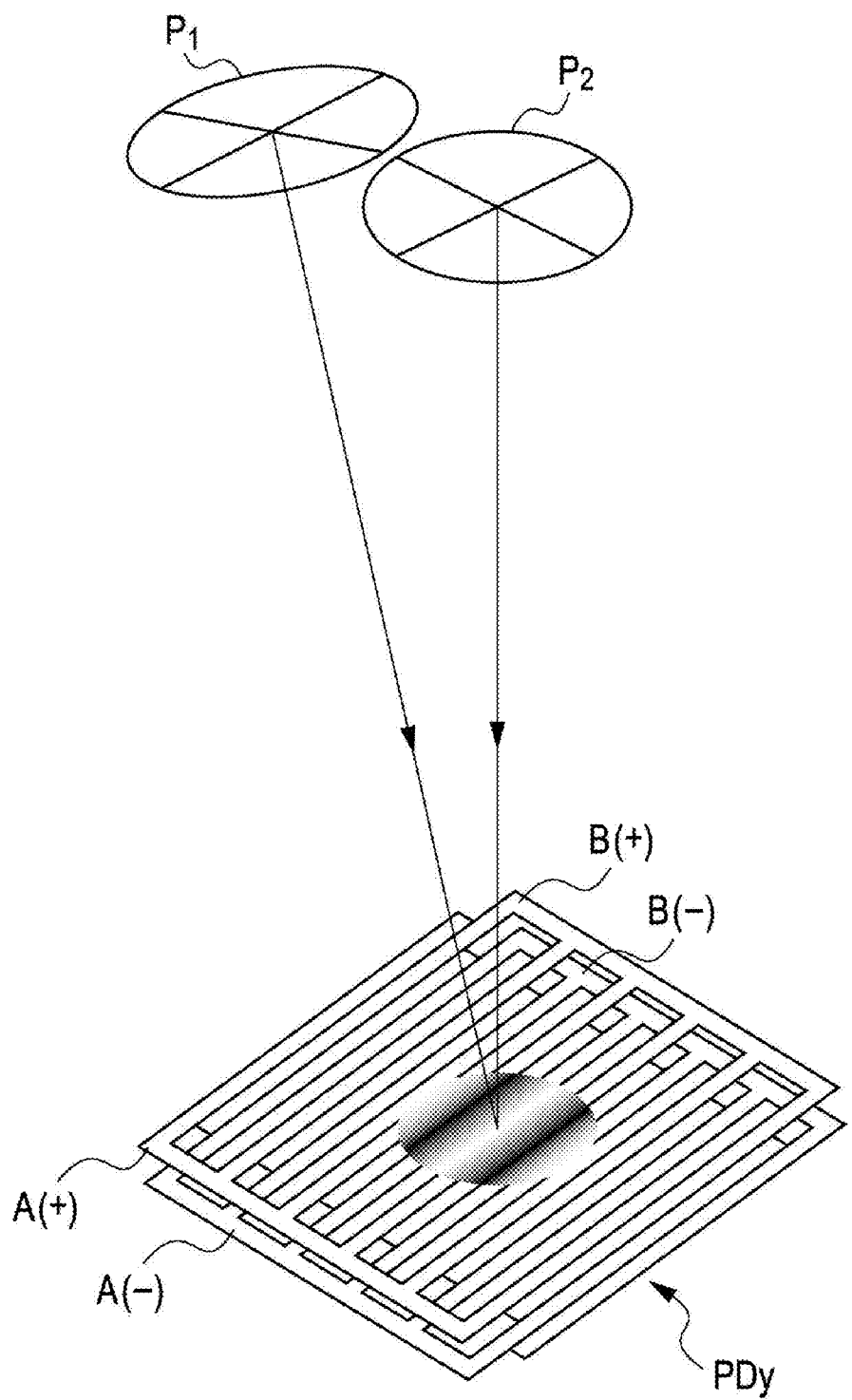
FIG. 6 illustrates two light beams incident on a photodetector and interference fringes produced by the two light beams on photodetector elements.

Referring to FIG. 6, the period, height, and the like of the periodic pattern on each of the first and second diffraction gratings GBS0 and GT0 are set such that the period of the interference fringes produced as above becomes the same as the tooth period of the first photodetector PDy. For example, if the Y-direction period Py of the first diffraction grating GBS0 and the Y-direction period of the second diffraction grating GT0 are the same, the period of the interference fringes produced as described above is also the same as the foregoing two. Therefore, in the first exemplary embodiment, the Y-direction period of the periodic pattern on the first diffraction grating GBS0, the Y-direction period of the periodic pattern on the second diffraction grating GT0, and the tooth period of the first photodetector PDy are set to be the same as each other.

Assuming that the interference fringes move by Δd when the second diffraction grating GT0 moves in the Y direction by Δy, the following relationship holds:

$$\Delta d = 2\Delta y \qquad \text{Expression (1)}$$

In this case, the Y-direction displacement amount $\Delta y_0$ with which a single period of a sine-wave signal is generated by the first photodetector PDy is expressed as follows:

$$\Delta y_0 = Py/2 \qquad \text{Expression (2)}$$

where Py denotes the Y-direction period of the periodic pattern on the second diffraction grating GT0.

Next, measurement of displacement in the Z direction will be described.

The third diffracted beam $l_3$ incident at point $P_3$ on the surface of the reflector FM facing the first diffraction grating GBS0 is reflected by the reflector FM and is obliquely incident on the second photodetector PDz. Meanwhile, the first diffracted beam $l_1$ incident at point $P_1$ is reflected by the second diffraction grating GT0 and produces the +1st-order diffracted beam that is diffracted in the +Y direction and the −1st-order diffracted beam that is diffracted in the −Y direction. The −1st-order diffracted beam is incident at point $P_4$ on the surface of the reflector FM facing the second diffraction grating GT0 and is reflected by the reflector FM. The first diffracted beam $l_1$ reflected at point $P_4$ is then incident at point $P_5$ on the second diffraction grating GT0, and produces a +1st-order diffracted beam. The +1st-order diffracted beam is then output in the −Z direction and is perpendicularly incident on the second photodetector PDz.

The two beams incident on the second photodetector PDz interfere with each other, producing interference fringes thereon. When the second diffraction grating GT0 moves in the Z direction, the interference fringes also move. With the movement of the interference fringes, sine-wave signals are output from the second photodetector PDz. The phases of the signals are calculated by the corresponding calculation unit CU. Thus, displacement information with respect to the Z direction is obtained.

The period, height, and the like of the periodic pattern on each of the first and second diffraction gratings GBS0 and GT0 are set such that the period of the interference fringes produced as above becomes the same as the tooth period of the second photodetector PDz. In the first exemplary embodiment, the beams diffracted in the Y direction are utilized for measurement of displacement in the Z direction. Therefore, the Y-direction period of the periodic pattern on each of the first and second diffraction gratings GBS0 and GT0 and the tooth period of the second photodetector PDz are set to be the same as each other.

Assuming that the interference fringes move by Δd when the second diffraction grating GT0 moves in the Z direction by Δz, the following relationship holds:

$$\Delta d = \frac{2 \cdot \left[ \frac{1}{\cos\{\sin^{-1}(\lambda/P_y)\}} + 1 \right]}{\lambda} \cdot \Delta z \qquad \text{Expression (3)}$$

where λ denotes the center wavelength of light from the light source LS, and Py denotes the Y-direction period of the periodic pattern on the second diffraction grating GT0.

In this case, the Z-direction displacement amount $\Delta z_0$ with which a single period of a sine-wave signal is generated by the second photodetector PDz is expressed as follows:

$$\Delta z_0 = \frac{P_y \cdot \lambda}{2 \cdot \left[ \frac{1}{\cos\{\sin^{-1}(\lambda/P_y)\}} + 1 \right]} \qquad \text{Expression (4)}$$

Thus, periodic signals representing the Y-direction displacement and the Z-direction displacement of the second diffraction grating GT0 are output simultaneously.

Figure 14:
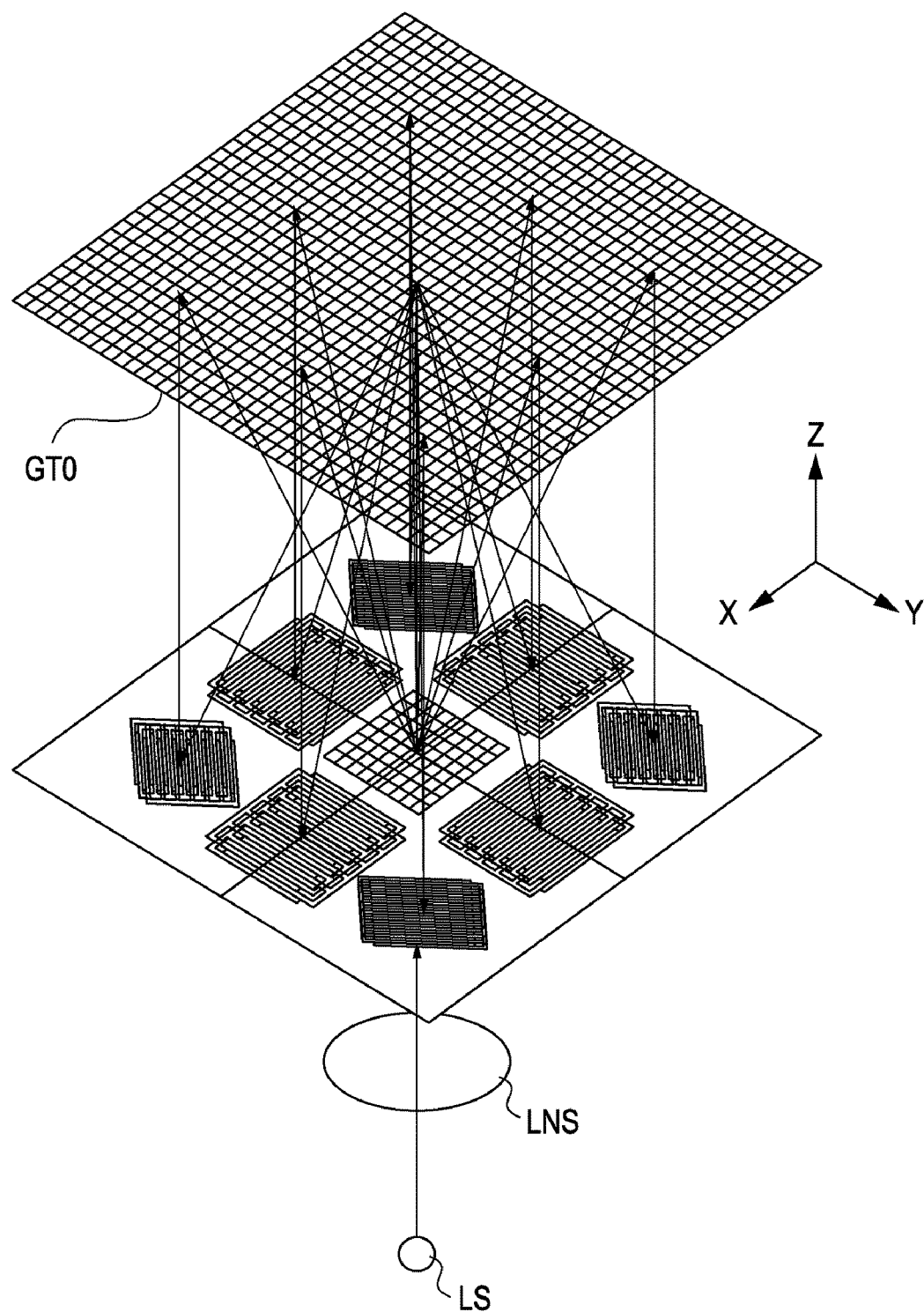
FIG. 14 shows an arrangement of an optical system included in an exemplary displacement measurement apparatus that measures displacements by utilizing diffracted light beams in eight directions.

In the first exemplary embodiment, Z-direction displacement is measured by utilizing the beams from the first diffraction grating GBS0 diffracted in the Y direction. Alternatively, Z-direction displacement may be measured by utilizing beams diffracted in any other directions. For example, referring to FIG. 14, beams diffracted in the X direction, beams diffracted in the X+Y direction, or beams diffracted in the X−Y direction may be utilized.

Second Exemplary Embodiment

Figure 7:
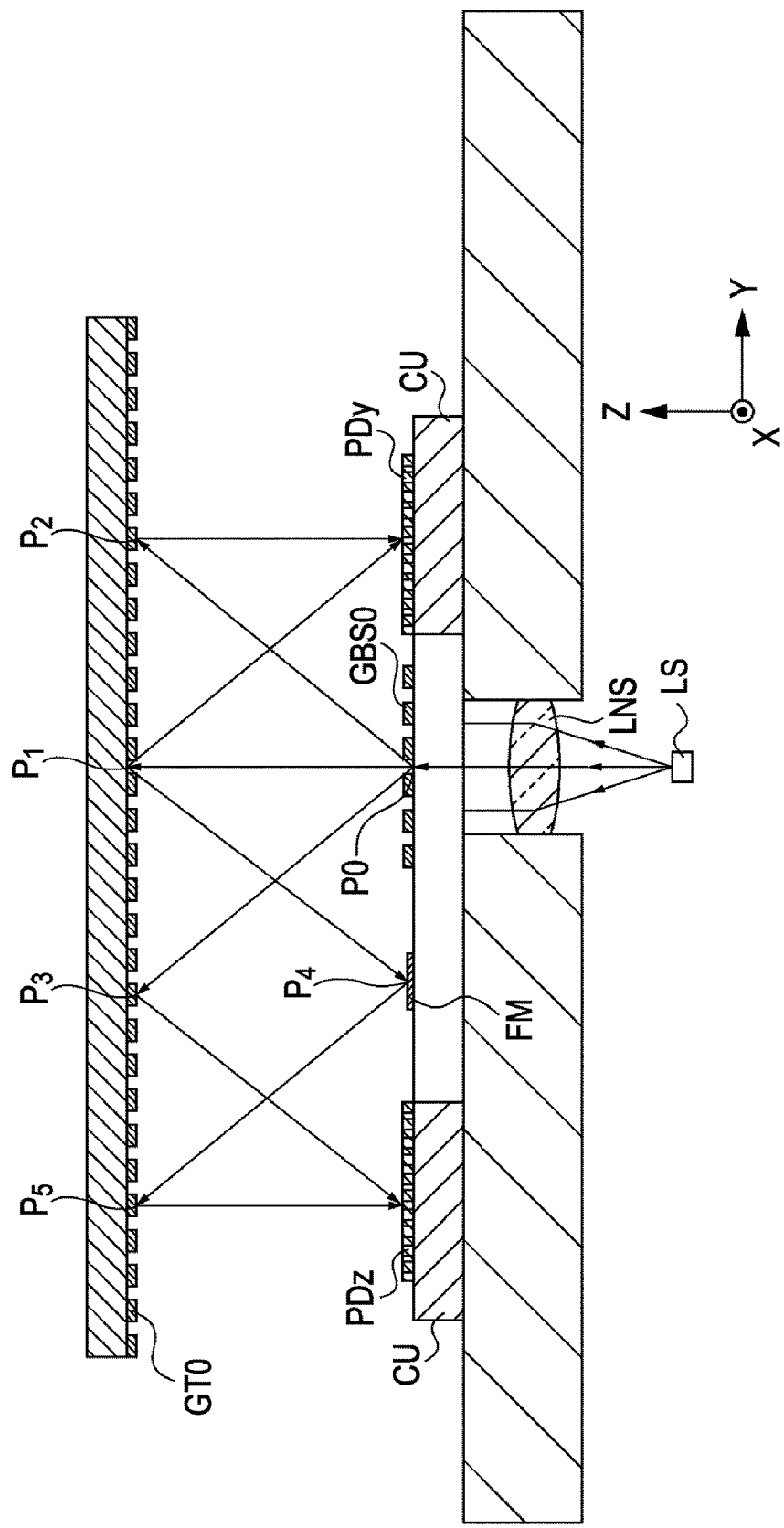
FIG. 7 is a schematic cross-sectional view showing optical elements of a displacement measurement apparatus according to a second exemplary embodiment of the present invention.

FIG. 7 is a schematic cross-sectional view showing optical elements of a displacement measurement apparatus according to a second exemplary embodiment of the present invention.

The second exemplary embodiment is a variation of the first exemplary embodiment and concerns measurement of displacements in the Y and Z directions. The Y direction corresponds to the first direction, and the Z direction corresponds to the second direction. In the second exemplary embodiment, the reflector FM is provided in the plane where the first diffraction grating GBS0 and the first and second photodetectors PDy and PDz are provided. The reflector FM has a reflective surface on one side thereof facing the second diffraction grating GT0 so as to reflect light from the second diffraction grating GT0. The second exemplary embodiment differs from the first exemplary embodiment in the optical system provided for Z-direction measurement, but is the same as the first exemplary embodiment in the arrangement of the first and second diffraction gratings GBS0 and GT0 and the first and second photodetectors PDy and PDz, and the configuration of the optical system provided for Y-direction measurement.

Measurement of displacement in the Z direction will now be described.

The third diffracted beam $l_3$ diffracted in the −Y direction by the first diffraction grating GBS0 is specularly reflected (i.e., undergoes 0th-order reflective diffraction) at point $P_3$ on the second diffraction grating GT0 and is obliquely incident on the second photodetector PDz. Meanwhile, the first diffracted beam $l_1$ incident at point $P_1$ is reflected by the second diffraction grating GT0 and produces a +1st-order diffracted beam that is diffracted in the +Y direction and a −1st-order diffracted beam that is diffracted in the −Y direction. The −1st-order diffracted beam is incident at point $P_4$ on the surface of the reflector FM facing the second diffraction grating GT0 and is reflected thereat. The first diffracted beam $l_1$ reflected at point $P_4$ is incident at point $P_5$ on the second diffraction grating GT0, and produces a +1st-order diffracted beam. The +1st-order diffracted beam is output in the −Z direction and is perpendicularly incident on the second photodetector PDz.

The two beams incident on the second photodetector PDz interfere with each other, producing interference fringes thereon. When the second diffraction grating GT0 moves in the Z direction, the interference fringes also move. With the movement of the interference fringes, sine-wave signals are output from the second photodetector PDz. The phases of the signals are calculated by the corresponding calculation unit CU. Thus, displacement information with respect to the Z direction is obtained.

In the second exemplary embodiment, as in the first exemplary embodiment, the Y-direction period of the periodic pattern on each of the first and second diffraction gratings GBS0 and GT0 and the tooth period of the second photodetector PDz are set to be the same as each other. When the second diffraction grating GT0 moves in the Z direction by Δz, the difference in each of the two beams is the amount of displacement along an optical path extending in the Z direction. Therefore, when the interference fringes move by Δd, the following relationship holds:

$$\Delta d = \frac{2 \cdot \Delta z}{\lambda} \qquad \text{Expression (5)}$$

where λ denotes the center wavelength of light from the light source LS.

In this case, the Z-direction displacement amount $\Delta z_0$ with which a single period of a sine-wave signal is generated by the second photodetector PDz is expressed as follows:

$$\Delta z_0 = \frac{P_y \cdot \lambda}{2} \qquad \text{Expression (6)}$$

where Py denotes the Y-direction period of the periodic pattern on the second diffraction grating GT0.

In the second exemplary embodiment, a support member or the like for supporting the reflector FM, which is not provided between the first diffraction grating GBS0 and the second diffraction grating GT0, is unnecessary in a space between the first and second diffraction gratings GBS0 and GT0. This reduces the number of components to be included in the apparatus, realizes a simple configuration, and enables easy assembly.

In the second exemplary embodiment, Z-direction displacement is measured by utilizing the beams from the first diffraction grating GBS0 diffracted in the Y direction. Alternatively, Z-direction displacement may be measured by utilizing beams diffracted in any other directions. For example, referring to FIG. 14, beams diffracted in the X direction, beams diffracted in the X+Y direction, or beams diffracted in the X−Y direction may be utilized.

Third Exemplary Embodiment

Figure 8:
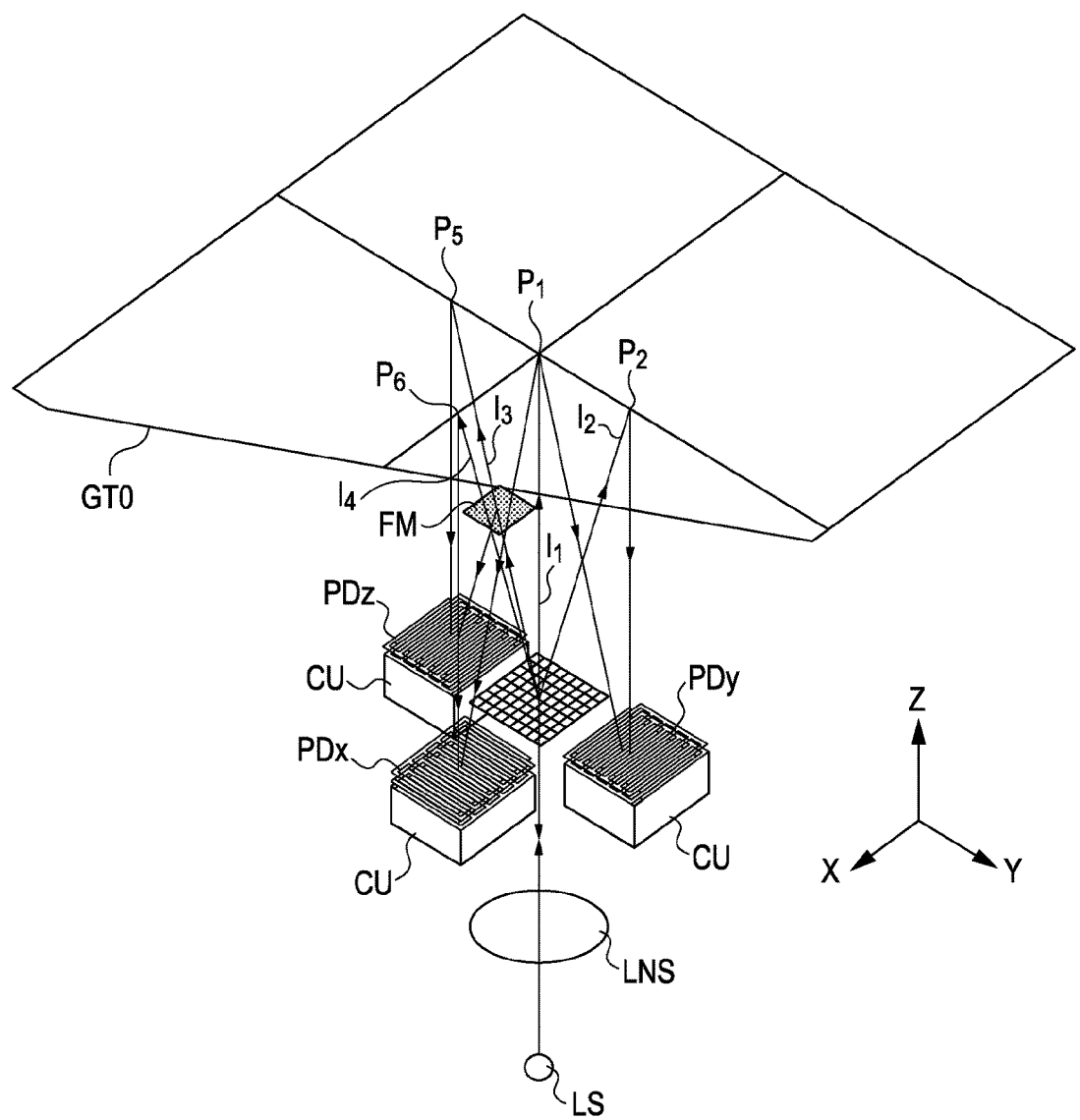
FIG. 8 is a schematic perspective view showing optical elements of a displacement measurement apparatus according to a third exemplary embodiment of the present invention.

FIG. 8 is a schematic perspective view showing optical elements of a displacement measurement apparatus according to a third exemplary embodiment of the present invention.

In the third exemplary embodiment, displacements not only in the Y and Z directions but also in the X direction are to be measured. The Y direction corresponds to the first direction, the Z direction corresponds to the second direction, and the X direction corresponds to a third direction.

The plurality of diffracted beams produced when light is transmitted through the first diffraction grating GBS0 include, in addition to the first to third diffracted beams $l_1$ to $l_3$, a fourth diffracted beam $l_4$ that undergoes 1st-order diffraction in the +X direction, unlike the first to third diffracted beams $l_1$ to $l_3$. The first diffracted beam $l_1$ that is transmitted through the first diffraction grating GBS0 and travels straight ahead and the fourth diffracted beam $l_4$ are received as interference light by a third photodetector PDx, whereby X-direction displacement is measured.

The fourth diffracted beam $l_4$ is incident at point $P_6$ on the second diffraction grating GT0, producing a beam that undergoes −1st-order diffraction in the +X direction and is perpendicularly incident on the third photodetector PDx. Meanwhile, the first diffracted beam $l_1$ that is incident at point $P_1$ on the second diffraction grating GT0 and undergoes +1st-order diffraction in the +X direction is obliquely incident on the third photodetector PDx. The two beams received by the third photodetector PDx interfere with each other, producing interference fringes thereon.

The third photodetector PDx is configured to have a tooth period the same as the period of the interference fringes produced as described above. Four comb-shaped photodetector elements included in the third photodetector PDx output respective sine-wave periodic signals that are out of phase with each other by 90 degrees. Therefore, by counting the numbers of waves included in the periodic signals and determining the phases of the sine waves with the corresponding calculation unit CU, displacement information with respect to the X direction is obtained.

The second diffraction grating GT0 of the third exemplary embodiment needs to have on the surface thereof facing the first diffraction grating GBS0 a periodic grating pattern of fine structures arranged not only in the Y direction but also in the X direction. To measure displacement in the X direction, the second diffraction grating GT0 needs to cause reflective diffraction in the X direction.

In the third exemplary embodiment, Z-direction displacement is measured by utilizing the beams from the first diffraction grating GBS0 diffracted in the Y direction. Alternatively, Z-direction displacement may be measured by utilizing beams diffracted in any other directions. For example, referring to FIG. 14, beams diffracted in the X direction, beams diffracted in the X+Y direction, or beams diffracted in the X−Y direction may be utilized. Furthermore, the number of axes along which measurement is performed can be increased easily. Simultaneous detection along four or more axes with a single optical system is also possible. For example, in addition to measurements in the X, Y, and the Z directions, measurements in the X+Y direction, the X−Y direction, and the like can be performed.

Fourth Exemplary Embodiment

Figure 9:
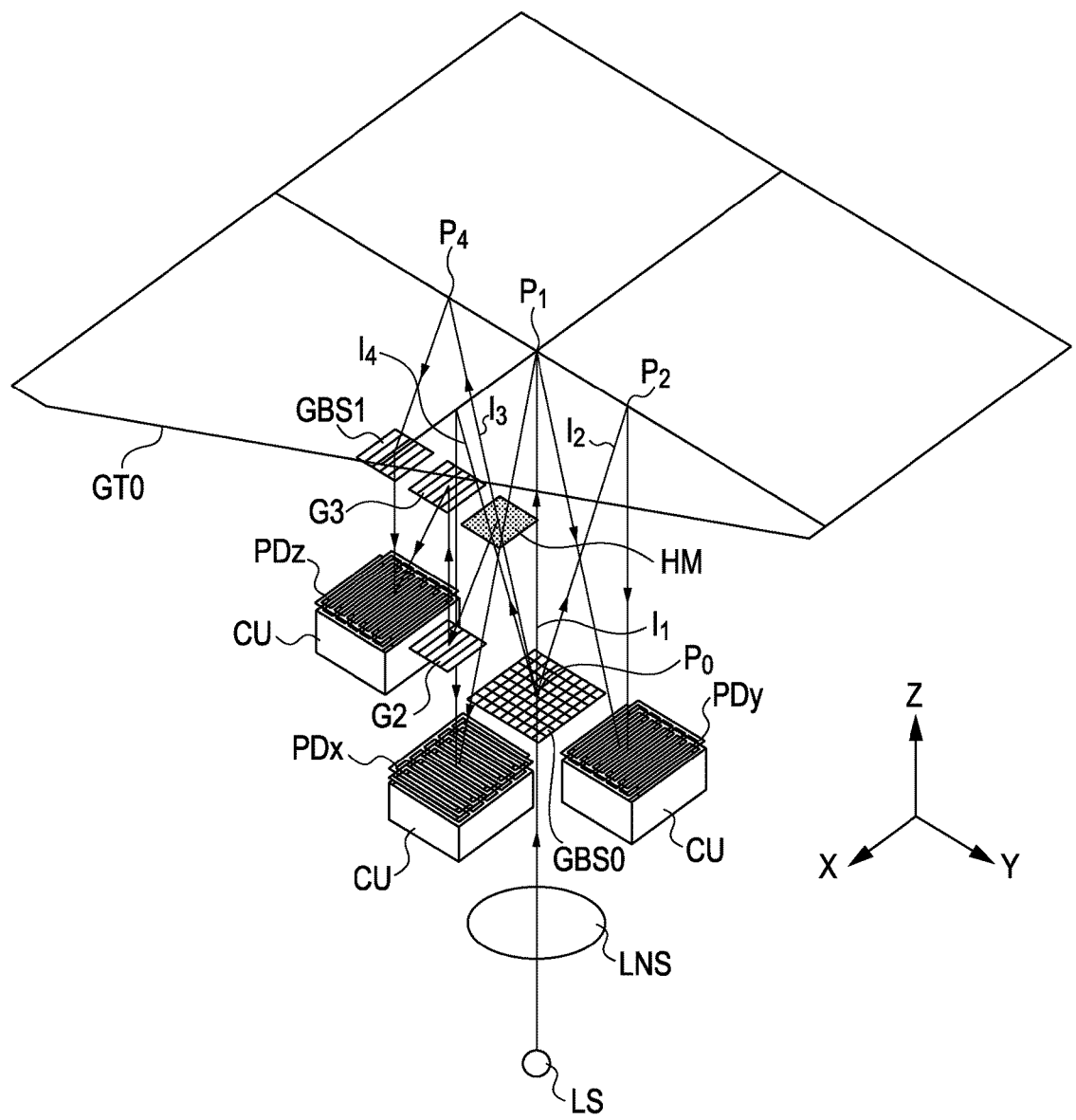
FIG. 9 is a schematic perspective view showing optical elements of a displacement measurement apparatus according to a fourth exemplary embodiment of the present invention.
Figure 10:
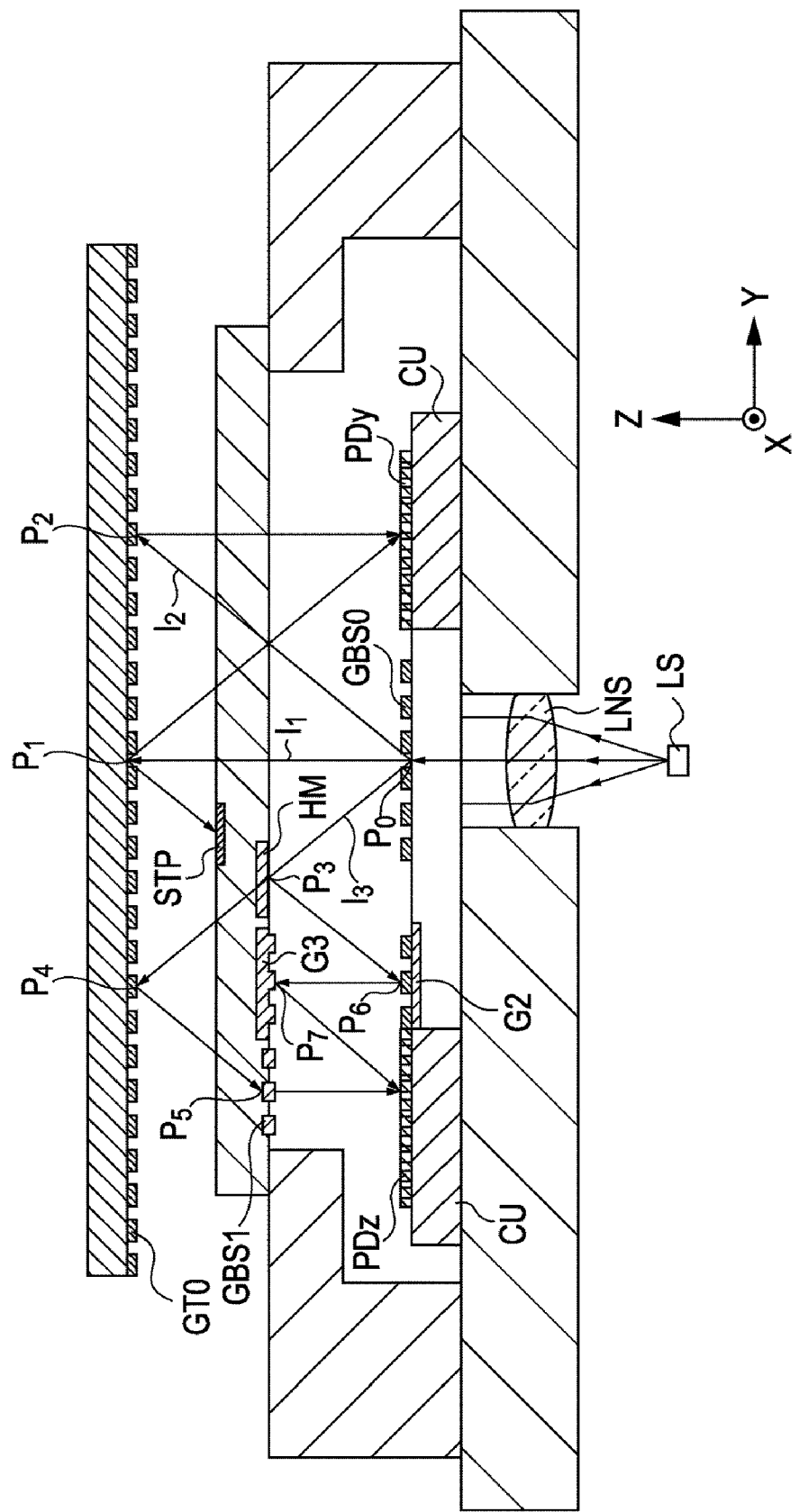
FIG. 10 is a schematic cross-sectional view showing the optical elements of the displacement measurement apparatus according to the fourth exemplary embodiment.

FIG. 9 is a schematic perspective view showing optical elements of a displacement measurement apparatus according to a fourth exemplary embodiment of the present invention. FIG. 10 is a schematic cross-sectional view showing the optical elements of the displacement measurement apparatus according to the fourth exemplary embodiment.

The apparatus shown in FIGS. 9 and 10 basically includes the same elements as those in the first to third exemplary embodiments, the elements being denoted by the same reference numerals. The apparatus further includes a light splitter HM, a first deflector GBS1, a second deflector G2, a third deflector G3, and a light-blocking member STP.

In the fourth exemplary embodiment, displacements not only in the Y and Z directions but also in the X direction are to be measured. The Y direction corresponds to the first direction, the Z direction corresponds to the second direction, and the X direction corresponds to the third direction.

In the fourth exemplary embodiment, the reflector FM employed in the first to third exemplary embodiments is omitted. Instead, the apparatus includes the light splitter HM, which transmits and reflects the third diffracted beam $l_3$ and thus splits the third diffracted beam $l_3$ into two beams, and the light-blocking member STP, which blocks the first diffracted beam $l_1$ diffracted by the second diffraction grating GT0 and undergone −1st-order diffraction in the −Y direction. The light splitter HM of the fourth exemplary embodiment is a half mirror. Two beams, produced by the third diffracted beam $l_3$ transmitted through and reflected by the light splitter HM, respectively, in combination form interference light, which is received by the second photodetector PDz. Thus, displacement in the Z direction is measured. Measurement of displacement in the Y direction is the same as in the first to third exemplary embodiment, and measurement of displacement in the X direction is the same as in the third exemplary embodiment.

In the fourth exemplary embodiment, the length of an optical path of the third diffracted beam $l_3$ from the point of transmission through the light splitter HM to the point of incidence on the second photodetector PDz is equal to the length of an optical path of the third diffracted beam $l_3$ from the point of reflection by the light splitter HM to the point of incidence on the second photodetector PDz. That is, the light splitter HM, the first deflector GBS1, and the third deflector G3 are provided in a particular plane defined at the midpoint between the first diffraction grating GBS0 and the second diffraction grating GT0. When the first deflector GBS1 moves in the Z direction, the light splitter HM, the first deflector GBS1, and the third deflector G3 also move such that they stay within the plane at the midpoint. Thus, the fourth exemplary embodiment concerns an application of the measurement principle of the Michelson interferometer in which the length of an optical path of measurement light traveling via a surface to be measured (the second diffraction grating GT0) is equal to the length of an optical path of reference light traveling via a reference surface (the second deflector G2).

Measurement of displacement in the Z direction will now be described.

The third diffracted beam $l_3$ diffracted in the −Y direction by the first diffraction grating GBS0 and incident at point $P_3$ on the light splitter HM is transmitted through the light splitter HM, and is specularly reflected (i.e., undergoes 0th-order reflective diffraction) at point $P_4$ on the second diffraction grating GT0. The beam specularly reflected at point $P_4$ is incident on the first deflector GBS1, thus produces a beam diffracted and deflected in the +Y direction, and is then perpendicularly incident on the second photodetector PDz. Meanwhile, the third diffracted beam $l_3$ reflected by the light splitter HM strikes the second deflector G2 at point $P_6$ and the third deflector G3 at point $P_7$, and is then obliquely incident on the second photodetector PDz. The first diffracted beam $l_1$, which would be incident on the second photodetector PDz in the first to third exemplary embodiments, is blocked by the light-blocking member STP after undergoing reflective diffraction in the −Y direction on the second diffraction grating GT0. Therefore, the first diffracted beam $l_1$ does not reach the second photodetector PDz.

The two beams incident on the second photodetector PDz interfere with each other, producing interference fringes thereon. When the second diffraction grating GT0 moves in the Z direction, the interference fringes also move. With the movement of the interference fringes, sine-wave signals are output from the second photodetector PDz. The phases of the signals are calculated by the corresponding calculation unit CU. Thus, displacement information with respect to the Z direction is obtained.

Moreover, referring to FIG. 10, the optical paths along which the two beams incident on the second photodetector PDz travel are geometrically of the same length. In a case where the optical paths of the two beams are of different lengths, optical elements need to be arranged precisely in accordance with the wavelength of light emitted from the light source LS. In contrast, in the case where the optical paths of the two beams are of the same length, optical elements can be arranged regardless of the wavelength of light emitted from the light source LS. Therefore, the light source LS may be an SLD or the like, which have low coherence. In that case, effects of multiple interference caused by unnecessary beams from a grating interferometer or a Michelson interferometer can be eliminated. Accordingly, measurement with much higher accuracy is realized.

In the fourth exemplary embodiment, as in the first exemplary embodiment, the Y-direction period of the periodic pattern on each of the first and second diffraction gratings GBS0 and GT0 and the tooth period of the second photodetector PDz are set to be the same as each other. Assuming that the interference fringes move by $\Delta d$ when the second diffraction grating GT0 moves in the Z direction by $\Delta z$, the following relationship holds:

$$\Delta d = \frac{P_y \cdot \lambda}{2 \cdot \left[\frac{1}{\cos\{\sin^{-1}(\lambda/P_y)\}}\right]} \cdot \Delta z \quad \text{Expression (7)}$$

where $\lambda$ denotes the center wavelength of light from the light source LS, and Py denotes the Y-direction period of the periodic pattern on the second diffraction grating GT0.

In this case, the Z-direction displacement amount $\Delta z_0$ with which a single period of a sine-wave signal is generated by the second photodetector PDz is expressed as follows:

$$\Delta z_0 = \frac{P_y \cdot \lambda}{2 \cdot \left[\frac{1}{\cos\{\sin^{-1}(\lambda/P_y)\}}\right]} \quad \text{Expression (8)}$$

In the fourth exemplary embodiment, Z-direction displacement is measured by utilizing the beams from the first diffraction grating GBS0 diffracted in the Y direction. Alternatively, Z-direction displacement may be measured by utilizing beams diffracted in any other directions. For example, referring to FIG. 14, beams diffracted in the X direction, beams diffracted in the X+Y direction, or beams diffracted in the X−Y direction may be utilized.

In addition, the light splitter HM that splits the third diffracted beam $l_3$ so as to measure X-direction displacement may be a diffraction grating.

Fifth Exemplary Embodiment

Figure 11:
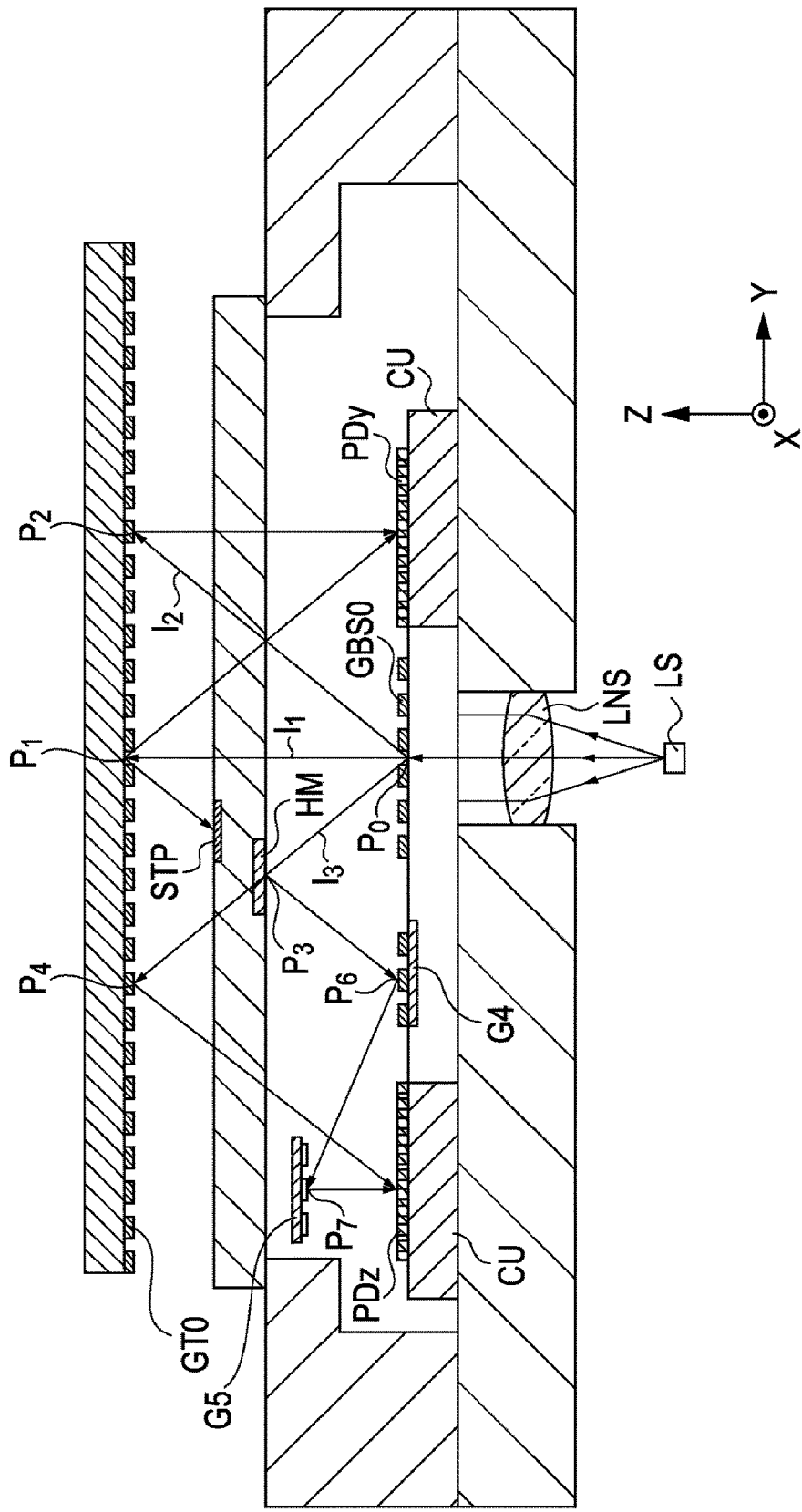
FIG. 11 is a schematic cross-sectional view showing optical elements of a displacement measurement apparatus according to a fifth exemplary embodiment of the present invention.

FIG. 11 is a schematic cross-sectional view showing optical elements of a displacement measurement apparatus according to a fifth exemplary embodiment of the present invention.

The fifth exemplary embodiment is a variation of the fourth exemplary embodiment and concerns measurement of displacements in the Y and Z directions. The Y direction corresponds to the first direction, and the Z direction corresponds to the second direction. As in the fourth exemplary embodiment, the fifth exemplary embodiment concerns an application of the measurement principle of the Michelson interferometer in which interference light produced by two beams resulting from splitting of the third diffracted beam $l_3$ incident on the light splitter HM is utilized for measurement of displacement in the Z direction, and the lengths of optical paths of the two beams are equal to each other.

Measurement of displacement in the Z direction will now be described.

The third diffracted beam $l_3$ diffracted in the −Y direction by the first diffraction grating GBS0 and incident at point $P_3$ on the light splitter HM is transmitted through the light splitter HM, and is specularly reflected (i.e., undergoes 0th-order reflective diffraction) at point $P_4$ on the second diffraction grating GT0. The beam specularly reflected at point $P_4$ is obliquely incident on the second photodetector PDz.

Meanwhile, the third diffracted beam $l_3$ reflected at point $P_3$ on the light splitter HM strikes a fourth deflector G4 at point $P_6$ and a fifth deflector G5 at point $P_7$, and is then perpendicularly incident on the second photodetector PDz. The optical paths along which the two beams incident on the second photodetector PDz travel can be designed so as to geometrically have the same length by optimizing the pattern pitches and positions of the fourth and fifth deflectors G4 and G5.

The two beams incident on the second photodetector PDz interfere with each other, producing interference fringes thereon. When the second diffraction grating GT0 moves in the Z direction, the interference fringes also move. With the movement of the interference fringes, sine-wave signals are output from the second photodetector PDz. The phases of the signals are calculated by the corresponding calculation unit CU. Thus, displacement information with respect to the Z direction is obtained.

Moreover, referring to FIG. 11, the optical paths along which the two beams to be incident on the second photodetector PDz travel are geometrically of the same length. Therefore, the light source LS may be an SLD or the like, which have low coherence. In that case, effects of multiple interference caused by unnecessary beams from a grating interferometer or a Michelson interferometer can be eliminated. Accordingly, measurement with much higher accuracy is realized.

Sixth Exemplary Embodiment

Figure 12:
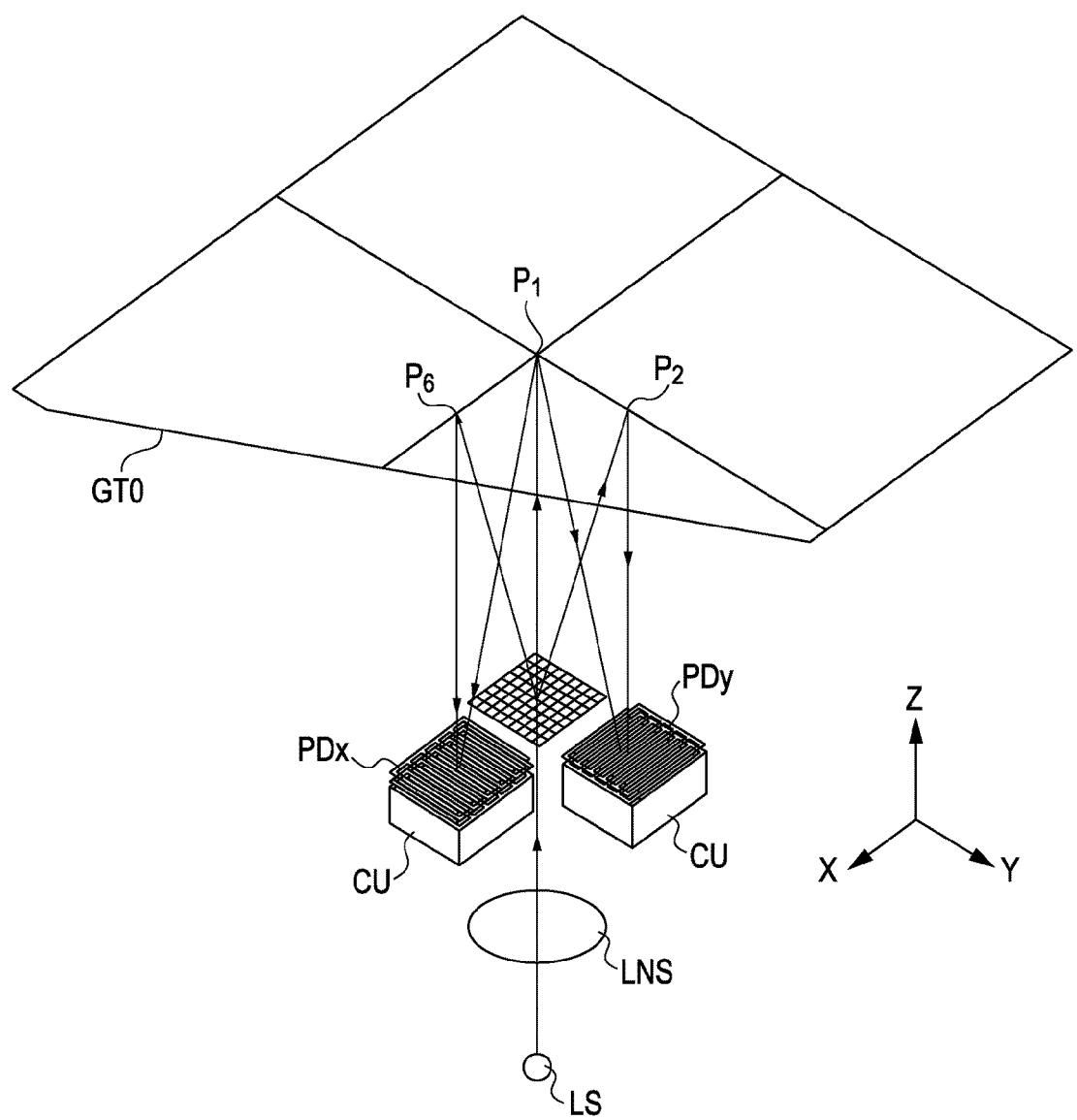
FIG. 12 is a schematic perspective view showing optical elements of a displacement measurement apparatus according to a sixth exemplary embodiment of the present invention.

FIG. 12 is a schematic perspective view showing optical elements of a displacement measurement apparatus according to a sixth exemplary embodiment of the present invention.

The first to fifth exemplary embodiments concern the case where displacements at least in the Y and Z directions are to be measured. Whereas, the sixth exemplary embodiment concerns a case where displacements in the X and Y directions, i.e., displacements in two directions defined within the plane where the second diffraction grating GT0 is provided, are to be measured. The Y direction corresponds to the first direction, and the X direction corresponds to the second direction. Measurements of the Y- and X-direction displacements are the same as in the third exemplary embodiment.

In the sixth exemplary embodiment, the first and second diffracted beams $l_1$ and $l_2$ behave in the same way as in the third exemplary embodiment, while the third diffracted beam $l_3$ does not. The third diffracted beam $l_3$ is diffracted and deflected in the +X direction, and is incident on the second photodetector PDx. Furthermore, the photodetector PDx that measures the X-direction displacement serves as the second photodetector, unlike in the third exemplary embodiment.

The first photodetector PDy receives interference light produced by the first and second diffracted beams $l_1$ and $l_2$ that are reflected and diffracted by the second diffraction grating GT0, and outputs sine-wave signals to the corresponding calculation unit CU. The calculation unit CU calculates the phases of the signals, whereby displacement information with respect to the Y direction is obtained. Likewise, the second photodetector PDx receives interference light produced by the first and third diffracted beams $l_1$ and $l_3$ that are reflected and diffracted by the second diffraction grating GT0, and outputs sine-wave signals to the corresponding calculation unit CU. The calculation unit CU calculates the phases of the signals, whereby displacement information with respect to the X direction is obtained.

Seventh Exemplary Embodiment

Figure 13:
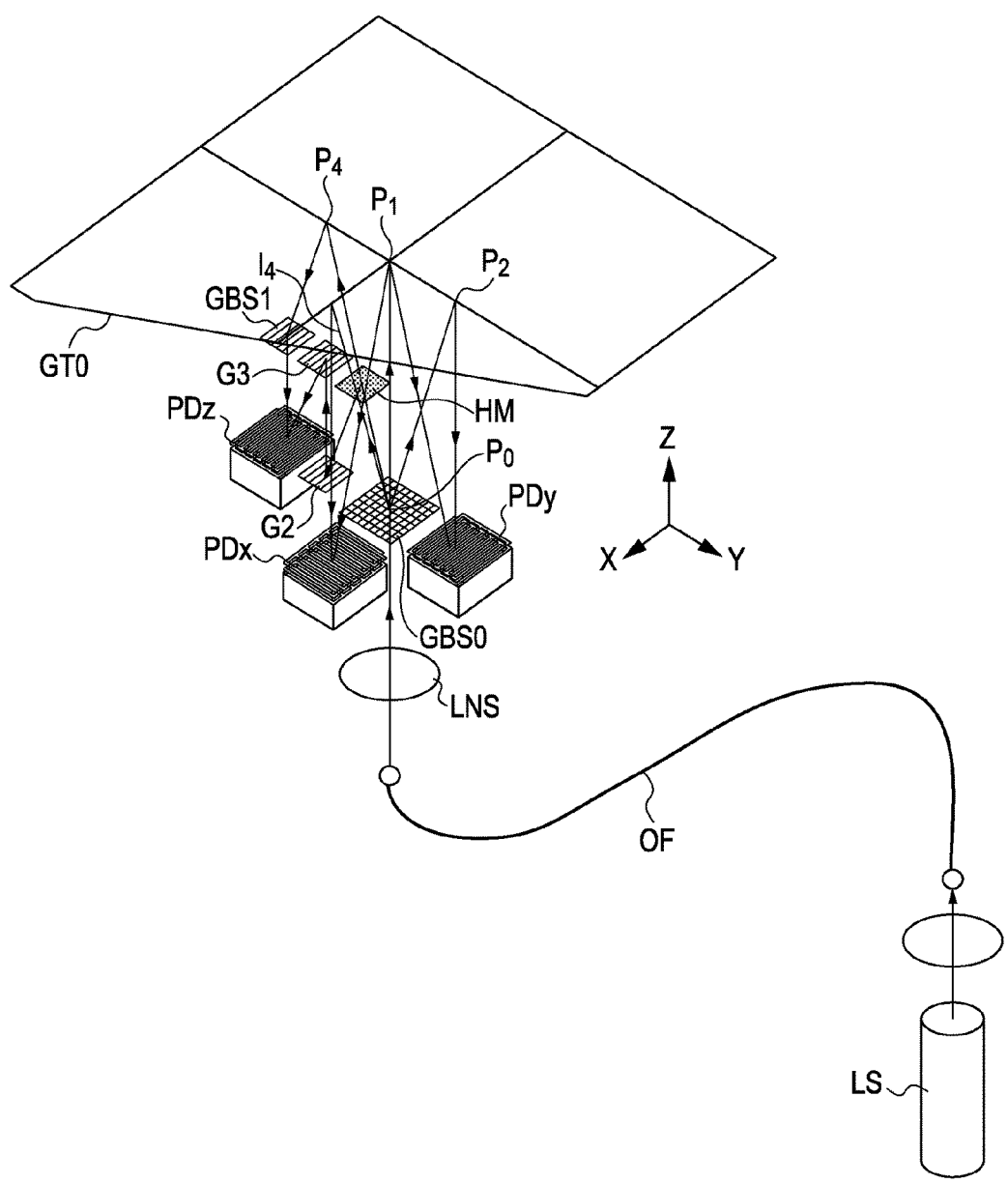
FIG. 13 is a schematic perspective view showing optical elements of a displacement measurement apparatus according to a seventh exemplary embodiment of the present invention.

FIG. 13 is a schematic perspective view showing optical elements of a displacement measurement apparatus according to a seventh exemplary embodiment of the present invention.

In the apparatus according to the seventh exemplary embodiment, the light source LS is provided at a position remote from the optical system, and light from the light source LS is guided by an optical fiber OF to the optical system. Specifically, an output end of the optical fiber OF is placed at the position where the light source would be placed in the other exemplary embodiments, and the light from the light source LS is supplied from the outside through the optical fiber OF. That is, the displacement measurement apparatus of the seventh exemplary embodiment does not include the light source LS. The light source LS is provided outside the displacement measurement apparatus.

In the seventh exemplary embodiment, the light source LS can be placed at a position remote from the optical system constituted by various optical elements including the first and second diffraction gratings GBS0 and GT0. Therefore, the optical system is less affected by heat generated from the light source LS. Such a configuration advantageously reduces adverse effects of the heat on measurement accuracy. In the case shown in FIG. 13, the optical fiber OF is provided between the light source LS and a position corresponding to the lens LNS of the third exemplary embodiment. Alternatively, the optical fiber OF may be provided between the lens LNS and the first diffraction grating GBS0.

Figure 15:
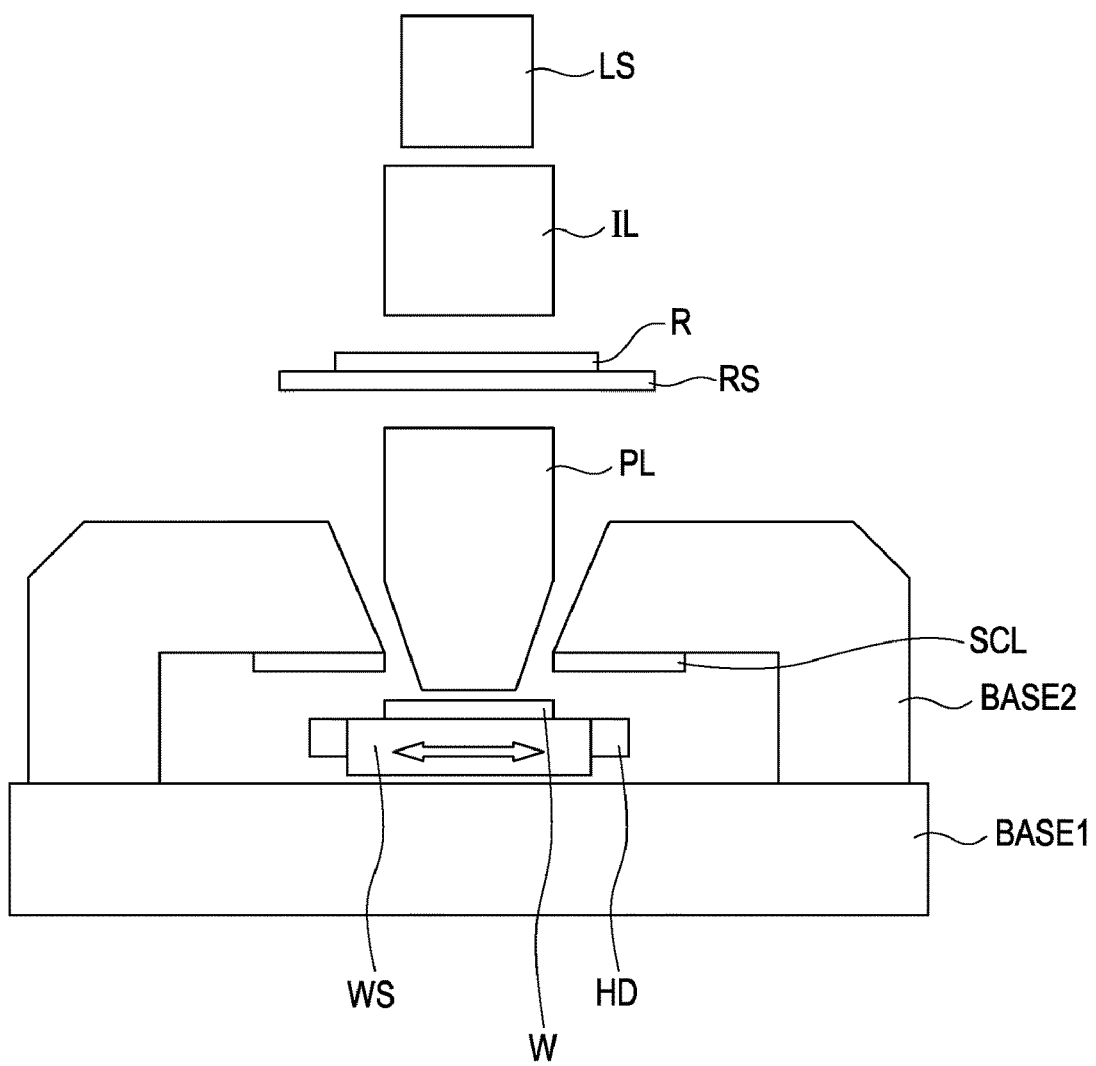
FIG. 15 schematically shows an exemplary exposure apparatus including any of the displacement measurement apparatuses according to the exemplary embodiments.

The displacement measurement apparatuses according to the above exemplary embodiments of the present invention can be applied to apparatuses that are required to detect nanometer- or subnanometer-order displacements: for example, an industrial mechanical stage, a high-accuracy shape measurement apparatus, a microscope stage, a high-accuracy machining apparatus, a semiconductor exposure apparatus, a semiconductor manufacturing apparatus, and the like. FIG. 15 schematically shows an exemplary exposure apparatus including any of the displacement measurement apparatuses according to the above exemplary embodiments. The exposure apparatus includes a light source LS, an illumination optical system IL that illuminates a reticle R, a projection optical system PL that projects light applied by the illumination optical system IL onto a wafer W, a reticle stage RS that holds and moves the reticle R, a wafer stage WS that holds and moves the wafer W, an encoder scale (a second diffraction grating) SCL, an encoder detection-optical-system head HD (including a light source, a first diffraction grating, and photodetectors), a reference base block BASE1, and a base block BASE2 that holds the encoder scale SCL. In the exposure apparatus shown in FIG. 15, the head HD is secured on a side face of the wafer stage WS, and, while the wafer stage WS is moved two-dimensionally, laser light is applied to the scale SCL and diffracted light from the scale SCL is received by the head HD. Thus, positional information with respect to the horizontal direction and the gap direction is obtained.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-250529 filed Sep. 29, 2008, which is hereby incorporated by reference herein in its entirety.

What is claimed is:

1. A displacement measurement apparatus comprising:
a first diffraction grating provided in parallel with a plane and configured to transmit a light from a light source and produce first, second, and third diffracted beams;
a second diffraction grating provided in parallel with the plane and configured to reflect the produced first, second, and third diffracted beams, one of the first diffraction grating and the second diffraction grating being movable relative to the other together with an object to be measured;
a reflector configured to reflect a beam produced by the second diffraction grating diffracting the produced first diffracted beam to produce a first reflected beam, and reflect the produced third diffracted beam to produce a second reflected beam;
a first photodetector configured to receive a first interference light produced by interference of a beam, produced by the second diffraction grating diffracting the produced first diffracted beam, and a beam, produced by the second diffraction grating diffracting the produced second diffracted beam;
a second photodetector configured to receive a second interference light produced by a beam, produced by the second diffraction grating diffracting the first reflected beam, and the second reflected beam; and a calculation unit configured to calculate a displacement of the object in a first direction in accordance with the first interference light received by the first photodetector, and a displacement of the object in a second direction, in accordance with the second interference light received by the second photodetector, the first direction being parallel with the plane, the second direction being perpendicular to the plane.

* * * * *